(12) United States Patent
Girondi

(10) Patent No.: US 7,552,626 B2
(45) Date of Patent: Jun. 30, 2009

(54) DEVICE FOR INDICATING FUEL FILTER CLOGGING IN INTERNAL COMBUSTION ENGINES, PARTICULARLY DIESEL ENGINES

(75) Inventor: Giorgio Girondi, Mantova (IT)

(73) Assignee: UFI Filters S.P.A., Porto Mantovano (Mantova) (IT)

( * ) Notice: Subject to any disclaimer, the term of this patent is extended or adjusted under 35 U.S.C. 154(b) by 321 days.

(21) Appl. No.: 10/594,958

(22) PCT Filed: Mar. 23, 2005

(86) PCT No.: PCT/EP2005/003249

§ 371 (c)(1),
(2), (4) Date: Sep. 29, 2006

(87) PCT Pub. No.: WO2005/098227

PCT Pub. Date: Oct. 20, 2005

(65) Prior Publication Data

US 2008/0264153 A1    Oct. 30, 2008

(30) Foreign Application Priority Data

Apr. 9, 2004   (IT)   .......................... RE2004A0032

(51) Int. Cl.
*G01M 15/09* (2006.01)
(52) U.S. Cl. .................................................. 73/114.38
(58) Field of Classification Search ............... 73/114.31, 73/114.38, 114.41, 114.42, 114.43
See application file for complete search history.

(56) References Cited

U.S. PATENT DOCUMENTS

| 4,522,712 | A | | 6/1985 | Fischer et al. |
| 5,188,728 | A | | 2/1993 | Traonvoez et al. |
| 5,702,592 | A | * | 12/1997 | Suri et al. ..................... 210/90 |
| 6,514,404 | B1 | * | 2/2003 | Bauer .......................... 210/86 |
| 7,225,680 | B2 | * | 6/2007 | Gustafson et al. ............. 73/754 |
| 2005/0150304 | A1 | * | 7/2005 | Gustafson et al. ............. 73/754 |
| 2006/0059995 | A1 | * | 3/2006 | Gustafson et al. ............. 73/736 |
| 2006/0225711 | A1 | * | 10/2006 | Schelhas ...................... 123/511 |
| 2006/0225993 | A1 | * | 10/2006 | Heuthorst et al. .......... 200/83 J |
| 2008/0148807 | A1 | * | 6/2008 | Berry et al. ................... 73/1.57 |

FOREIGN PATENT DOCUMENTS

| DE | 101 63 164 A1 | 7/2003 |
| GB | 1 057 855 A | 2/1967 |

\* cited by examiner

*Primary Examiner*—Eric S McCall
(74) *Attorney, Agent, or Firm*—Browdy and Neimark, P.L.L.C.

(57) ABSTRACT

A device for indicating clogging of the fuel filter (1) of internal combustion engines, in particular diesel engines, the filter having an outer casing (2) closed by a cover (3) of amagnetic material, and a filter element (5) which, together with a disc (30) to which it is connected, defines two chambers (6 and 7) for fuel entry and exit respectively; the device further includes a pressure sensor (10) sensing the difference between the entry and exit fuel pressure and housed inside the filter casing, and a sensor (21) for generating a signal proportional to the pressure difference which is located outside the filter casing and is not mechanically connected to the pressure sensor.

12 Claims, 2 Drawing Sheets

DEVICE FOR INDICATING FUEL FILTER CLOGGING IN INTERNAL COMBUSTION ENGINES, PARTICULARLY DIESEL ENGINES

TECHNICAL FIELD

The present invention relates generally to a fuel filter for use in internal combustion engines, and more particularly in diesel engines.

PRIOR ART

Diesel fuel normally contains impurities, or more or less solid substances (especially paraffins) which separate at relatively low temperature.

For this reason the engine feed system must be provided with a suitable filter able to clean the fuel.

Modern diesel fuel filters generally consist of a cup-shaped outer casing and a closure cover. Said casing contains a coaxial filter cartridge of toroidal form which, when fixed to a connection disc, separates the internal volume of the cup into an entry chamber and an exit chamber for the fuel.

In retaining said impurities, said cartridge progressively clogs and has therefore to be periodically replaced.

However, said clogging does not always take place gradually, hence the clogging time is not constant and cannot be taken as a parameter for the regular replacement of the cartridge.

To determine the replacement interval such as to prevent the appearance of dangerous external particulate inclusions in the fuel, automatic diagnostic devices are known.

Based on the observation that the fuel pressure difference between the filter inlet and outlet is a quantity related, to a sufficiently reliable and significant extent, to the degree of clogging of the filter, said devices activate indicator means when a limiting value of said pressure difference is exceeded.

Said devices generally comprise a cylindrical chamber and a piston slidable in its interior to divide it into two half-chambers, of which one communicates with the fuel inlet and the other with the fuel outlet. Said chamber, which can be provided directly within the filter casing or within a separate container, also houses a spring means acting on the piston against the action of the pressure difference, and an electromechanical or electromagnetic switch providing a signal as the result of a movement of said piston against the action of the spring.

The described device is mounted in suitable seats provided in the filter casing and fixed thereto by known means by way of suitable seal gaskets. However this configuration presents certain drawbacks: firstly, problems in sealing the filter against the external environment inevitably arise at the fixing between the seat and the device; in addition, the provision of said seats considerably complicates construction, while the presence of the gaskets makes it more difficult to mount and replace the device. Finally, these factors also produce a cost increase that cannot be ignored.

DISCLOSURE OF THE INVENTION

The object of the present invention is to overcome the stated drawbacks within the context of a simple, rational and low-cost solution.

The invention attains said object by virtue of the characteristics indicated in the claims.

In particular, the invention provides a device for indicating clogging of the fuel filter of internal combustion engines, comprising a pressure sensor means sensing the difference between the entry and exit fuel pressure and housed within the filter casing, and a means for generating a signal proportional to said pressure difference which is located outside the filter casing and is not mechanically connected to the pressure sensor means. By virtue of this solution, a device according to the invention does not induce sealing problems, is of simple installation and replacement, and is of low cost.

According to the preferred embodiment, the pressure sensor means comprises an elastically deformable element, for example a membrane or a bellows, mounted within the fuel entry chamber. When associated with the filter cartridge connection disc, said elastically deformable element defines a volume which communicates with the fuel exit chamber via a hole passing through the body of the disc. A magnet, associated with said elastically deformable element, is positioned such as to be able to move as a result of deformation of the sensor means.

Externally, the signal generating means is fixed, by a screw fixing, by insertion or by gluing, to the filter cover in a position corresponding with the underlying pressure sensor means.

According to the invention, said signal generating means comprises a Hall sensor, which emits a voltage signal proportional to the proximity of the magnet, and hence to the pressure difference, and a processor able to process it.

By this solution, the invention handles an analogue signal, hence allowing continuous monitoring of the state of the filter, and does not merely indicate when clogging has taken place, as in the case of known devices. Moreover, when necessary, the acceptable limiting value of the pressure difference can be easily and quickly adjusted by acting merely on the electronic parameters of the device.

BRIEF DESCRIPTION OF THE DRAWINGS

The characteristics and the constructional merits of the invention will be more apparent from the ensuing description given with reference to the figures of the accompanying drawings which illustrate a particular preferred embodiment by way of non-limiting example.

BEST MODE FOR CARRYING OUT THE INVENTION

Figure 1:
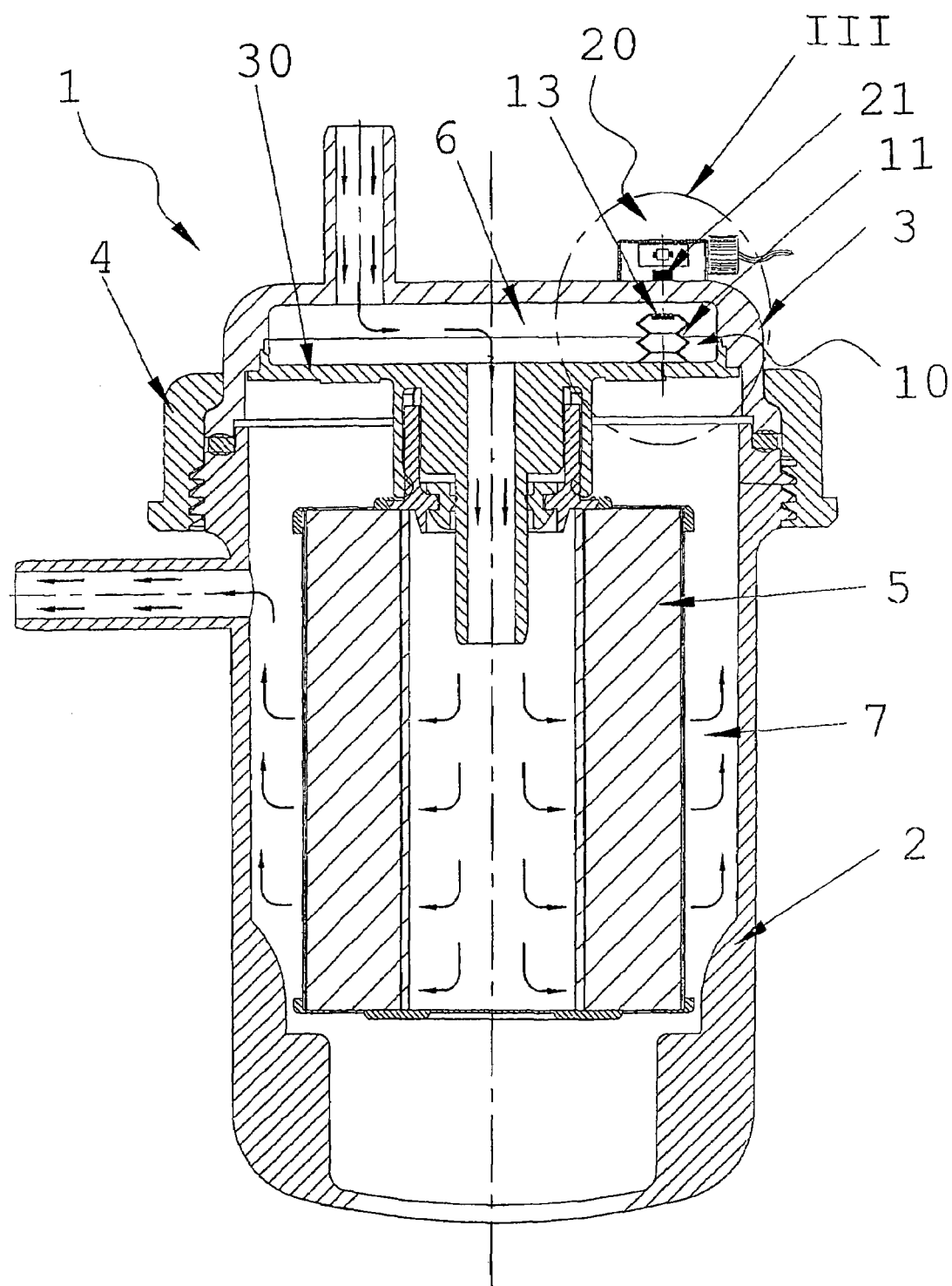
FIG. 1 is a side section through a filter of the invention.

Said figures, and in particular FIG. 1, show a diesel fuel filter for installation on a diesel engine.

Said filter, indicated by the reference numeral 1, comprises a cup-shaped outer casing 2, and an upper cover 3 of amagnetic material sealedly fixed to the casing by a ring nut 4.

Inside the casing 2 a disc 30 supports a filter cartridge 5 which divides the inner volume of the filter into two chambers, one 6 for the diesel fuel to be filtered, and the other 7 for the filtered diesel fuel, they being associated with an inlet conduit and an outlet conduit respectively.

Figure 2:
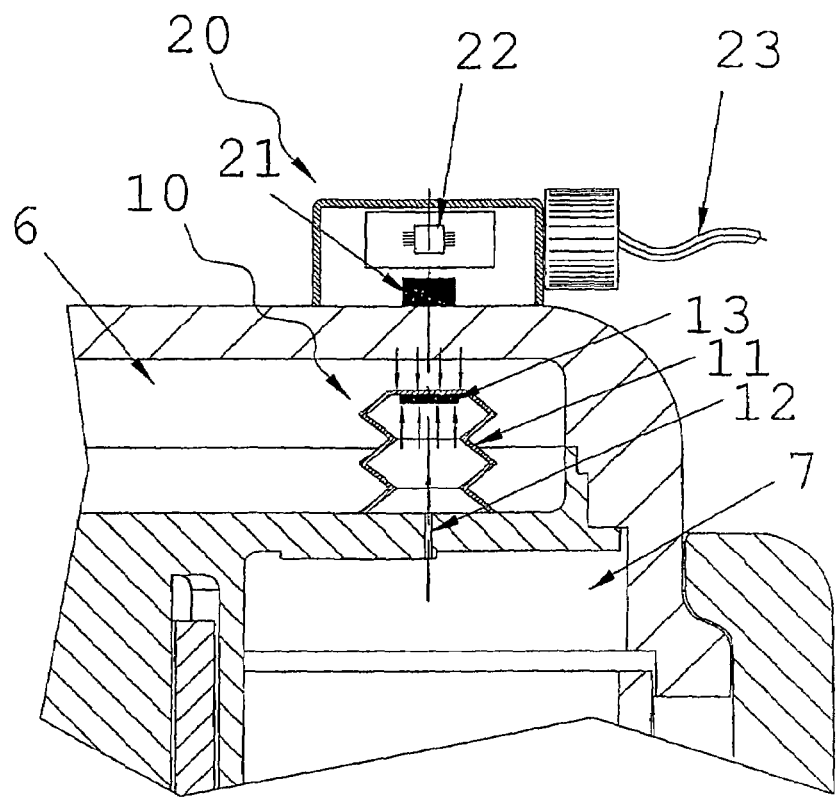
FIG. 2 shows on an enlarged scale the detail III of FIG. 1, in the configuration with a new filter cartridge
Figure 3:
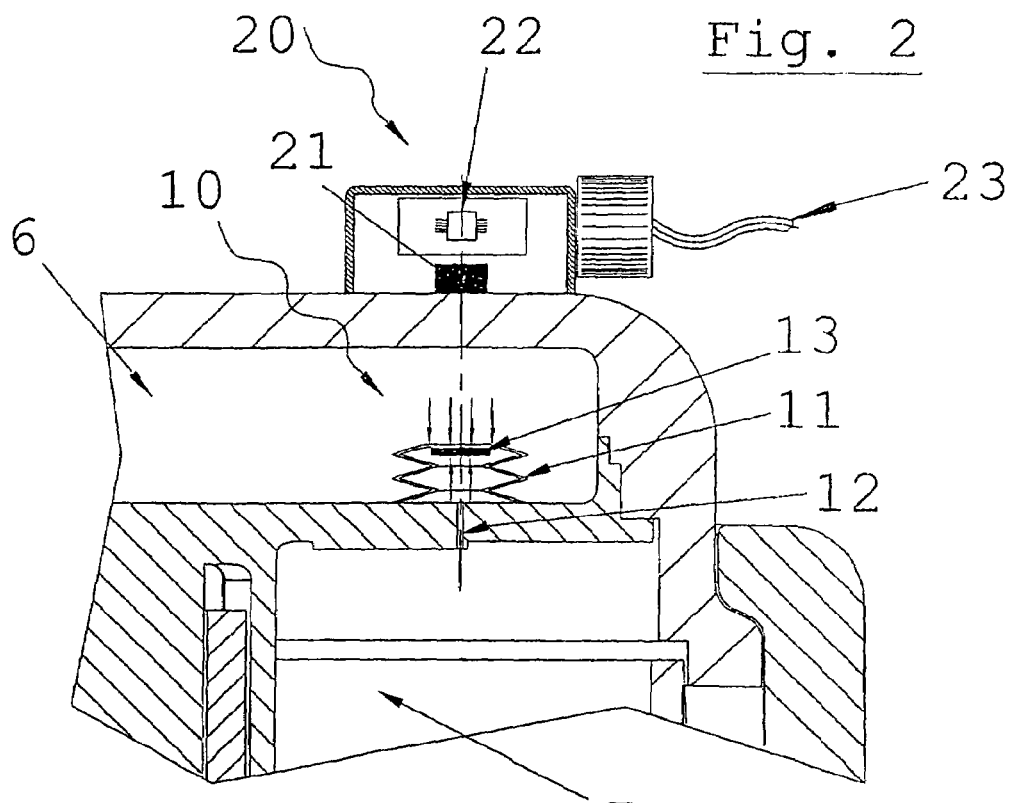
FIG. 3 shows the same detail as FIG. 2, but in the configuration with the cartridge clogged.

In the chamber 6 (see FIGS. 2 and 3) there is inserted a pressure sensor means 10, composed of an extendable membrane 11, a hole 12 which connects the volume on the inside of the membrane to the filtered diesel oil chamber 7, and a magnet 13 mounted on said membrane 11. The pressure sensor 10 is configured such that elongation or contraction of the membrane 11, and with it an axial movement of the magnet 13, takes place in response to variation in the pressure difference between the filtered diesel oil chamber 7 and the chamber 6 for the diesel oil to be filtered.

On the cover 3, in proximity to the sensor means 10, a signal generating means 20 is mounted, comprising a Hall sensor 21, a processor 22 and an output cable 23.

During normal operation of the diesel oil filter 1, with the cartridge 5 unclogged (see FIG. 2), the pressure in the chamber 6 upstream of the filter is virtually equal to the pressure in the downstream chamber 7.

In this state the membrane 11 is at its maximum elongation allowed by its shape, and the magnet 13 at the minimum distance from the Hall sensor 21 which hence indicates high magnetic field intensity. Said intensity, converted by the sensor 21 into a proportional voltage signal, is recognized by the processor 22 as indicative of a clean filter.

When the cartridge 5 begins to clog, the pressure in the chamber 6 containing diesel oil to be filtered increases relative to the pressure in the filtered diesel oil chamber 7. The pressure difference, opposed only by the rigidity of the membrane 11, causes it to lower with corresponding withdrawal of the magnet 13 from the Hall sensor 21.

As the distance varies, the intensity of the sensed magnetic field varies, as does the intensity of the voltage signal emitted by the Hall sensor.

An analogue quantity is therefore available which the processor is able to evaluate at each moment in the life of the filter, and when this falls below a value corresponding to excessive clogging of the cartridge 1 it indicates the need for its replacement.

The invention claimed is:

1. A fuel filter comprising a device for indicating clogging of the fuel filter of internal combustion engines, the filter comprising an outer casing closed by a cover of amagnetic material, and a filter element which, together with a disc to which said filter element is connected, defines two chambers for fuel entry and exit respectively, said device comprising a pressure sensor means sensing the difference between the entry and exit fuel pressure and housed inside the filter outer casing, and a means for generating a signal proportional to said pressure difference which is not mechanically connected to the pressure sensor means and is located outside the filter casing, characterised in that the pressure sensor means comprises an elastically deformable element which defines a variable volume inside the fuel entry or exit chamber; a conduit which connects said volume to the other chamber; and a magnet which, associated with said elastically deformable element, moves to follow the elongation or contraction of said elastically deformable element, whereby said elastically deformable element is composed of an extendable membrane.

2. An indicator device to be used in connection with the filter as define in claim 1.

3. The filter as claimed in claim 1, characterised in that said pressure sensor means is housed in the fuel entry chamber.

4. An indicator device to be used in connection with the filter as define in claim 3.

5. The filter as claimed in claim 1, characterised in that said elastically deformable element is fixed to the filter element connection disc.

6. An indicator device to be used in connection with the filter as define in claim 5.

7. The filter as claimed in claim 1, characterised in that said conduit is a through hole passing through the thickness of the element connection disc, in correspondence with said elastically deformable element.

8. An indicator device to be used in connection with the filter as define in claim 7.

9. The filter as claimed in claim 1, characterised in that said signal generating means comprise:
a Hall sensor sensitive to the magnetic field of the magnet of the pressure sensor means, and a processor for processing the voltage signal generated by the Hall sensor.

10. An indicator device to be used in connection with the filter as define in claim 9.

11. The filter as claimed in claim 1, characterised in that the signal generating means is positioned on the filter cover.

12. An indicator device to be used in connection with the filter as define in claim 11.

* * * * *